United States Patent [19]

Schlunke et al.

[11] Patent Number: 4,938,178
[45] Date of Patent: Jul. 3, 1990

[54] TWO STROKE CYCLE INTERNAL COMBUSTION ENGINES

[75] Inventors: Christopher K. Schlunke, Kingsley, Australia; Mark Lear, Tauranga, New Zealand

[73] Assignee: Orbital Engine Company Proprietary Limited, Balcatta, Australia

[21] Appl. No.: 378,513

[22] PCT Filed: Oct. 26, 1988

[86] PCT No.: PCT/AU88/00415
  § 371 Date: Jun. 26, 1989
  § 102(e) Date: Jun. 26, 1989

[87] PCT Pub. No.: WO89/03929
  PCT Pub. Date: May 5, 1989

[30] Foreign Application Priority Data

Oct. 26, 1987 [AU] Australia .................................. PI5102

[51] Int. Cl.[5] .............................................. F01N 3/28
[52] U.S. Cl. .................................. 123/65 PE; 123/302
[58] Field of Search .................. 123/65 PE, 65 P, 323; 60/314, 282, 295, 299, 302

[56] References Cited

U.S. PATENT DOCUMENTS

| 4,175,107 | 11/1979 | Iwaoka et al. | 422/114 |
| 4,195,063 | 3/1980 | Iwaoka et al. | 422/180 |
| 4,646,516 | 3/1987 | Bostock | 60/295 |
| 4,663,934 | 5/1987 | Sickels | 60/302 |
| 4,735,046 | 4/1988 | Iwai | 60/302 |
| 4,848,082 | 7/1989 | Takahashi et al. | 60/288 |

FOREIGN PATENT DOCUMENTS

| 52-24616 | 2/1977 | Japan | 60/302 |
| 0063509 | 5/1977 | Japan | 60/302 |
| 0203814 | 12/1982 | Japan | 60/302 |

Primary Examiner—David A. Okonsky
Attorney, Agent, or Firm—Armstrong, Nikaido, Marmelstein, Kubovcik & Murray

[57] ABSTRACT

A two stroke cycle engine 10 with an exhaust gas treatment catalyst. Separate reducing and oxidizing catalyst portions 126 and 127 are provided to treat different portions of the exhaust gas exhausted during each exhaust period. The portion of the exhaust gas high in NOx, usually that first exhausted upon initial opening of the exhaust port, is directed to be treated by the reducing catalyst 126 and the remainder of the exhaust gas is directed to be treated by the oxidizing catalyst 127.

23 Claims, 2 Drawing Sheets

TWO STROKE CYCLE INTERNAL COMBUSTION ENGINES

This invention relates to the controlling of exhaust gas emissions from two stroke cycle internal combustion engines by the use of catalysts to treat the undesirable components of the engine exhaust gas.

Environment protection authorities in various countries prescribe limits to the emissions in the exhaust gases of motor vehicles and usually the limits placed on emissions from private cars, motor cycles and light commercial vehicles are progressively becoming more strict. In most countries the permissible levels of emissions for automotive vehicles are stipulated on the basis of the weight of various components of the exhaust gas per mile or kilometer travelled, the limits applyomg irrespective of the weight of the vehicle or the size of the engine thereof. Accordingly, there has been a trend towards the production of small motor vehicles of relatively light weight whereby the rate of consumption of fuel can be reduced with a corresponding reduction in the weight of the various exhaust gas components generated per unit distance travelled.

The three major components of the exhaust gas which must be controlled are hydrocarbons (HC) oxides of nitrogen (NOx) and carbon monoxide (CO). NOx is normally treated by a catalyst that requires the establishment of a reducing environment to separate the oxygen from the nitrogen, whereas an oxidising atmosphere is required to treat the HC and CO.

The use of catalysts in the exhaust systems of vehicle internal combustion engines is widely known and practised in the control of exhaust emissions. It is customary to locate the catalyst in the exhaust system, somewhat downstream from the actual exhaust ports of the cylinder or cylinders of the engine, where the exhaust gases from any one cylinder or from a number of cylinders have been subject to a degree of mixing between the time of leaving the cylinder and reaching the catalyst. As a result of the mixing the distribution of the various components of the exhaust gas is approaching a homogeneous mixture when presented to the catalysts. Accordingly a catalyst system must be used that is able to treat the HC NOx and CO components of the generally homogeneous exhaust gas mixture.

It is known, as shown in SAE Paper 872098 relating to investigations by the Toyota Central Research and Development Laboratories, Inc., that the efficiency of conversion of a three-way catalyst system applied to an automotive type four stroke cycle engine is substantially dependent upon the air/fuel ratio of the exhaust gas presented to the catalyst. In particular it is known that the efficiency dramatically changes as the air/fuel ratio transits the stoichiometric ratio. As can be seen from the graph constituting FIG. 1 of the accompanying drawings, the efficiency of conversion of HC and CO increases as the air/fuel ratio of the exhaust gas increases, that is as the mixture gets leaner. In contrast, the efficiency of the conversion of NOx is high, whilst the air/fuel ratio is low, that is, with a rich exhaust gas mixture, but drops most dramatically as the air/fuel ratio passes through stoichiometric from a rich to a lean mixture.

Engines operating on the two stroke cycle have presented a substantial problem in the control of the level of exhaust emissions, particularly in engines where fuel is entrained in the air charge when it enters the engine cylinder, as part of that fuel passes unburnt through the exhaust port during the conventional scavenging process. This escape of unburnt fuel, that contributes to HC and CO in the exhaust gas, can be reduced by modern electronically controlled fuel injection systems that inject the fuel directly into the engine cylinder rather than the fuel being carried into the cylinder with the incoming air charge. However, the direct injection of the fuel does not in itself contribute significantly to the control of the generation of NOx, particularly as the rate of fuel consumption increases with the increase in size of the vehicle resulting in a corresponding increase in the level of NOx emissions when measured on a mass per unit distance travelled basis. Although other combustion control techniques can also be employed to contribute to the control of the level of NOx in small horsepower engines, the multiplication of the level of NOx generated with increasing power output, leads to a situation where the control of NOx is best exercised by way of catalytic treatment of the exhaust gases, particularly from the considerations of cost and stability of operation.

In a direct injected two stroke cycle engine the fuel free fresh charge which enters the engine cylinder, whilst the exhaust port and inlet port are both open, results in a dilution of the subsequently expelled exhaust gases to an air/fuel ratio considerably above stoichiometric. This results in oxidising conditions existing in the exhaust system which are in direct conflict with the desired reducing conditions necessary to achieve effective reduction of the NOx by catalytic treatment. Accordingly the provision of a conventional three-way catalyst system in the exhaust system at the conventional location to treat homogeneous exhaust gases would only result in a lowering of the HC and CO, but would not break down the NOx.

It is an object of the present invention to improve the performance of the catalyst system in the treatment of the exhaust gases in a two stroke cycle internal combustion engine.

With this object in view, there is provided a method of operating a two stroke cycle internal combustion engine wherein for each combustion chamber there is provided means to supply fuel to the combustion chamber, an exhaust port through which gases pass from the combustion chamber to an exhaust system, and at least one inlet port through which a fresh charge of air enters the combustion chamber, the inlet and exhaust ports being arranged so that the inlet port opens prior to the closing of the exhaust port, the method being characterised in that during an exhaust port open period of each combustion chamber a first portion of the gas exhausted from said combustion chamber during the exhaust port open period is directed into contact with a first catalyst means of a first catalytic character, and a subsequent second portion of the gas exhausted from said combustion chamber in the same exhaust port open period is directed into contact with a second catalyst means of a differing catalytic character to the first catalyst means.

In a two stroke cycle internal combustion engine with direct fuel injection the exhaust gases in said first portion are the gases that pass through the exhaust port when it first opens, and are often stoichiometric or richer in fuel and thus capable of sustaining a reduction process, whereas the exhaust gases in said second portion which pass through the exhaust port later are leaner in fuel and capable of sustaining an oxidation process. The stoichiometric or chemically reducing gases are those gases which generally contain most of the mass of nitrogen oxides produced in the combustion chamber. By the term chemically reducing gases is meant gases which have an oxygen deficiency for stoichiometric combustion. In other words, the gases may still contain free oxygen although in insufficient quantity to fully oxidise the unburnt fuel and products of partial combustion in the gases. Similarly, by the term chemically oxidising gases is meant gases which have an oxygen surplus for stoichiometric combustion.

Conveniently, the first catalyst means is located at or adjacent to the exhaust port of the particular combustion chamber. The location of the first catalyst means is selected so that during each exhaust port open period the first catalyst means will receive the exhaust gas that passes through the exhaust port during the initial portion of the exhaust port open period which is chemically reducing exhaust gas, and the first catalyst means includes an active catalyst material of a nature to reduce oxides of nitrogen (NOx) in the gases received from the exhaust port.

The location of the first catalyst means is preferably selected so that while the exhaust port is open, the first catalyst means receives substantially only the gases that have been exhausted through that particular exhaust port.

Conveniently, at least the first catalyst means is located in a passage extending from the exhaust port to an exhaust gas manifold communicating with respective exhaust ports of a plurality of cylinders of the engine. The end of the first catalyst means adjacent to the exhaust port is preferably minimally spaced therefrom so that when the exhaust port is open the air/fuel ratio of the exhaust gas at that end of the first catalyst means is not substantially different from that at the exhaust port.

The first and second catalyst means may both be incorporated in a catalyst system located at or adjacent the exhaust port with the active material of the catalyst system varying in chemical composition in the direction of the opening of the exhaust port. The active material of the catalyst at that end of the exhaust port first exposed during the opening of the exhaust port is the first catalyst means and of a reducing character, and the active material of the catalyst at the opposite end of the exhaust port is the second catalyst means and of an oxidising character.

Alternatively the second catalyst means of an oxidising character may be spaced downstream in the path of the exhaust gas from the exhaust port, and may be located in the manifold that communicates with the exhaust ports of a number of cylinders of the engine.

At least part of the first portion of the exhaust gas may be directed into contact with the second catalyst means after the first portion has been in contact with and treated by the first catalyst means. This may be effected by directing part of the first portion of the exhaust gas back into the combustion chamber or port after treatment by the first catalyst means.

Preferably the fuel is injected directly into the combustion chamber as direct injection contributes to the establishment of the variation in the chemical composition of the exhaust gas at the exhaust port at differing times in the exhaust period, and also reduces the fuel losses through the exhaust port to improve fuel efficiency.

There is also provided by the present invention a two stroke cycle internal combustion engine having for each combustion chamber means to supply fuel to the combustion chamber, an exhaust port through which gases pass from the combustion chamber to an exhaust system, and at least one inlet port through which a fresh charge of air enters the combustion chamber, the inlet and exhaust ports being arranged so that the inlet port opens prior to the closing of the exhaust port, characterised in that there is provided in the exhaust system a first catalyst means of a first catalytic character located to receive a first portion of the gas exhausted from the combustion chamber during an exhaust port open period, and second catalyst means to receive a second portion of the gas exhausted from the combustion chamber subsequent to the commencement in the same exhaust port open period as the exhausting of the first portion, said second catalyst means being of a different catalytic character to the first catalyst means.

The first catalyst means is of a reducing character and may be reactivated by exposure to said stoichiometric or chemically reducing gases after any partial deactivation by exposure to the chemically oxidising gases generated during the previous cycle of the combustion chamber.

Some of the chemically oxidising gases may pass over the catalyst means from the combustion chamber and be subsequently returned over the same catalyst means to the combustion chamber to be used as oxidant in the subsequent combustion stage of the combustion chamber's cycle.

The first catalyst means may conveniently be located to receive the exhaust gas exhausted from the engine during the period that the exhaust port is open prior to the inlet port opening.

Preferably the first catalyst means is located in or immediately adjacent to the exhaust port and the active catalyst materials are exposed to the gases leaving the combustion chamber before those gases have had an opportunity to mix to a significant degree and approach a homogeneous composition. The second catalyst means is not required to be located adjacent to the exhaust port and in fact may be located in the exhaust system a distance downstream from the exhaust port and the first catalyst means.

Preferably the first catalyst means extends from the end of the exhaust port that is first exposed during opening of the exhaust port to a level below the level at which the inlet port is opened.

The gases passing from the combustion chamber through the exhaust port upon initial opening of the exhaust port are the combustion gases arising from the burning of fuel-air mixture which is relatively fuel rich, such a mixture corresponding in most cases to a stoichiometric or lower air/fuel ratio. The gases passing out through the exhaust port later in the open period thereof and just before its closing are by comparison fuel lean, having an air/fuel ratio considerably higher than stoichiometric, due to inclusion of some of the fresh air that enters the combustion chamber after the inlet port has opened.

At the loads and speeds normally encountered in engine operation, such as those of significance to the driving cycle of an automobile engine, the following sequence of events will occur after the exhaust port opens on the expansion or exhaust stroke of a two cycle spark or compression ignition internal combustion engine with in-cylinder fuel injection and an exhaust catalyst means mounted in or close to the exhaust port.

(1) Initially the hot gases which have been compressed in the combustion chamber and have taken part in the combustion process travel through the exhaust port and travel through the catalyst means to some extent. In the regions of operation of an automotive engine that produce high levels of NOx during the driving cycle, this first portion of the exhaust gases generally has an air/fuel ratio which is stoichiometric or richer and the temperature is high. Ideal conditions for the reduction of NOx are thus generated at the catalyst because of the reducing nature of the fuel rich exhaust gas and the high temperature thereof.

(2) Subsequent to the passage of this hot, fuel rich gas through the exhaust port, a mixture of exhaust gas and fresh scavenging air at a lower temperature pass from the cylinder through the exhaust port as a result of the transfer ports or inlet valves being opened and fresh air being allowed to enter the cylinder. This second portion of the exhaust gases is lean because of the presence of fresh air. This means that a catalyst is operating in an oxidising atmosphere, which is ideal for the oxidation of HC emissions but which can degrade the ability of the catalyst material to reduce NOx emissions.

(3) Upon closure of all the ports, the scavenging process concludes and the flow of gas through the catalyst fails to almost zero.

A flow reversal or a number of flow reversals may occur at the exhaust port at some engine speeds, depending on the resonant characteristics of the exhaust and/or induction systems. As a result of these reversals gases may pass from the exhaust port back into the engine cylinder, during sequences 1 and 2 above and the gas may therefore experience a number of passes over the catalyst material, an advantage of locating the catalyst means in the exhaust port.

(4) Sequences (1-2-3) commence again upon the next opening of the exhaust port with the flow of hot, stoichiometric or fuel rich gas through the catalyst means. The high temperature reducing atmosphere created at the catalyst can have the effect of restoring the ability of the catalyst to reduce NOx emissions.

It is therefore seen that the above first and second portions of the exhaust gases have significantly different chemistries, and the engine's overall emissions benefit from providing different catalytic treatments to each portion.

The invention will be more readily understood from the following description of several practical arrangements of the invention as illustrated in the accompanying drawings.

Figure 1:
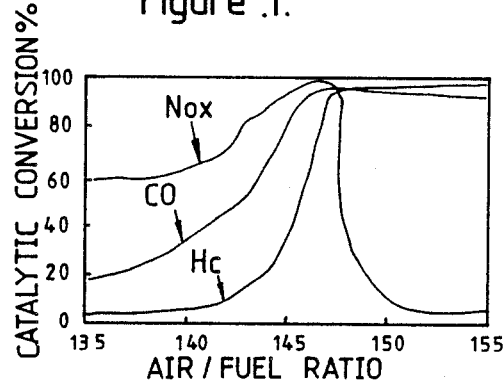
FIG. 1 is a graph showing the normal variation of conversion efficiency of a three way catalyst with the air/fuel ratio of the exhaust gas from a four stroke cycle engine exhaust gas when the air/fuel ratio is static.
Figure 2:
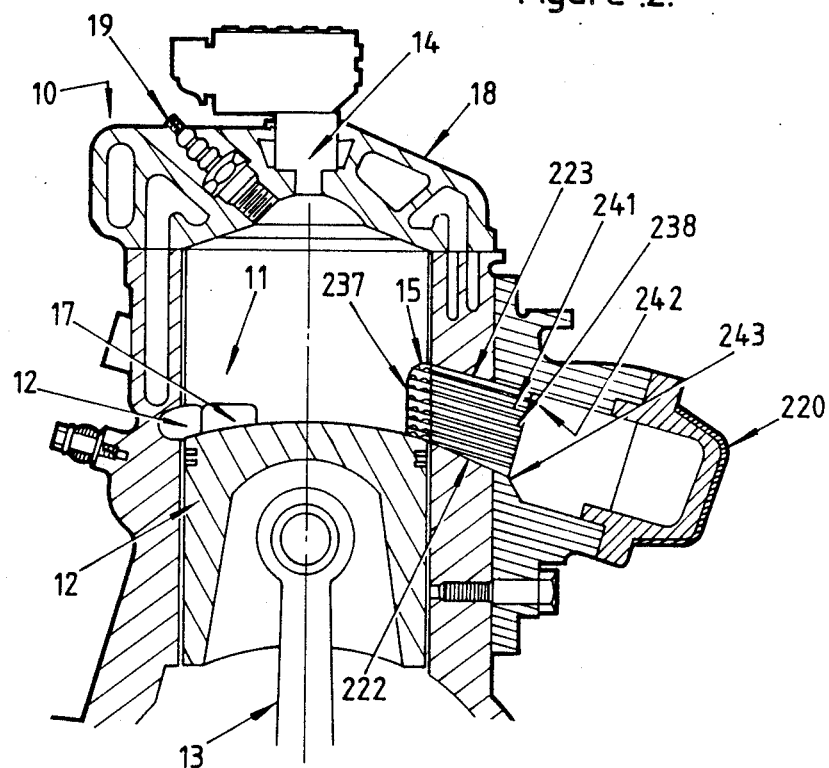
FIG. 2 shows diagramatically a cross section through portion of a two stroke cycle internal combustion engine with one arrangement of exhaust catalyst unit adjacent the engine exhaust port.

Referring now to FIG. 2, the engine 10 has a cylinder 11 in which the piston 12 reciprocates, the latter being connected by the rod 13 to a crankshaft (not shown). The engine operates on the conventional two stroke cycle and has an exhaust port 15 in one side of the cylinder 11 and transfer ports 16, 17 in the opposite side. The exhaust manifold 220 communicates with the exhaust port of each of the cylinders of the engine and with a common exhaust pipe (not shown). Each cylinder 11 has a spark plug 19 and a fuel injector 14 located in the cylinder head 18, the injector 14 introduces fuel directly into the combustion chamber.

The cross section of the cylinder as shown in FIG. 2 may be of a single cylinder engine or one cylinder of a multi-cylinder engine, of generally known construction.

As is known in the art of two stroke cycle engines, it is customary to provide a number of inlet or transfer ports through which the air charge enters the cylinder, and customarily there is only a single exhaust port. Again, as is common practice in two stroke cycle engines, the movement of the piston in the cylinder controls the opening and closing of the inlet and exhaust ports, with the relative disposition and dimensions of the respective ports being such that the exhaust port opens prior to the opening of the one or more transfer or inlet ports, and there is a period when both the inlet and exhaust ports are open to achieve effective scavenging of the cylinder.

Catalyst unit 223 is constructed with its inboard face 237 shaped in conformity with the wall of the engine cylinder 11 and contiguous with the piston 12 as it reciprocates. The catalyst unit 223 extends along the exhaust passage 222 and allows free movement of gases along its length from the inboard end adjacent the exhaust port 15 to the opposite end adjacent the exhaust manifold 20. The catalyst unit 223 is constructed with internal channels such that gas flow within the catalyst unit cannot occur to a significant extent in a direction parallel to the axis of the engine cylinder 11 i.e. the direction in which the exhaust porto 15 is exposed by the piston 12. Thus, exhaust gases entering the top 231 of the inboard face 237 of the catalyst unit 223, when the descending piston 12 first exposes the exhaust port 15, cannot exit from the lower portion 232 of the outboard face 238 of the catalyst unit into the manifold 220.

The catalyst unit 23 is constructed such that its upper portion as seen in FIG. 2 is loaded primarily with reducing catalyst and its lower portion is loaded primarily with an oxidizing catalyst. This is achieved by having the catalyst unit constructed from a number of sheet elements 241 stacked upon each other, the sheets varying in catalytic activity with the sheet at the top having only a reducing catalyst coating, and those at the bottom having only an oxidising catalyst coating. The sheets toward the centre may having a coating of either or both oxidising and reducing catalyst depending on the nature of the exhaust gas and the required treatment thereof which may vary with different engines.

Figure 3:
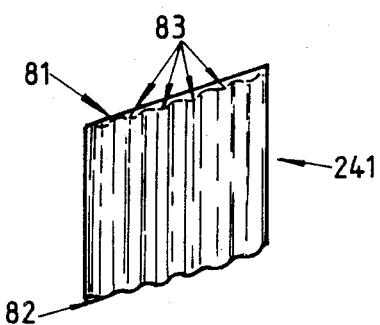
FIG. 3 shows the physical form of one element from a preferred form of the catalyst unit in FIG. 2.

Each sheet element 241 is cut from catalytic substrate of the generally known physical form shown in FIG. 3, where a flat metallic sheet 81 is bonded to a corrugated metallic sheet 82, leaving channels 83 there between. Due to the curved walls of the exhaust passage 222 adjoining sheet elements are different sizes so as to extend between the opposite walls of the passage at the level the sheet element is located.

The substrate of sheets 81 and 82 is coated with a thin layer of catalytically active material. The upper sheet element 242 has a coating high in rhodium content while the lower sheet element 243 has a coating high in platinum content. The intermediate sheet elements may have a coating which is a combination of rhodium and platinum, possibly with each sheet element of a different rhodium to platinum ratio, and this ratio may vary gradually between the extremes of the upper and lower elements 242 and 243.

In an alternative arrangement sheet elements 241 with only two different catalyst coatings are required. One group of elements with one catalytic coating of a dominant reducing activity are placed in the upper part of passage 222 and another group of elements with another catalytic coating of a dominant oxidising activity are placed in the lower part. It will be appreciated that this allows significant cost savings over the earlier described embodiment, which uses many different coating chemistries on the sheet elements to provide a gradual transition of catalytic activity, but it will also be appreciated that the abrupt change of catalyst type results in lower overall catalyst performance.

In a further alternative arrangement, the sheet elements 241 are deleted entirely from the lower part of the passage 222 but elements with reducing activity are positioned in the upper part of the passage. Such an arrangement may be supplemented by a separate catalyst with oxidising activity located downstream far enough so that it is contacted by the exhaust gas from other combustion chambers in the engine.

Figure 4:
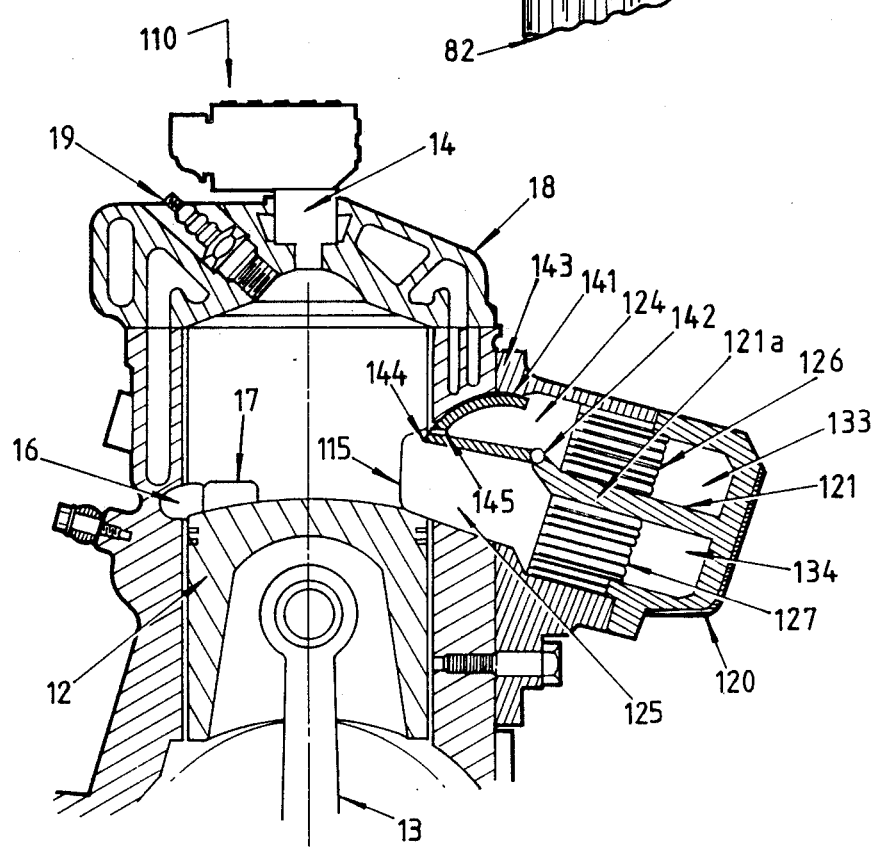
FIG. 4 shows diagramatically an engine similar to the engine of FIG. 2 but with an alternative arrangement of catalyst unit and associated exhaust configuration.

FIG. 4 illustrates another embodiment of the invention. The engine 10 is generally the same as that of FIG. 2, with the only significant difference being the configuration of the exhaust system. The exhaust manifold 120 is divided longitudinally by a web 121 into two manifold cavities 133, 134 which communicate downstream with a common exhaust pipe, and upstream with the upper and the lower exhaust passages 124, 125 respectively.

The passages 124, 125 are separated by a continuation 121a of the web 121 which extends towards the exhaust port 115. The passages 124, 125 contain respective catalyst units 126, 127 through which exhaust gases pass for treatment. The upper catalyst unit 126 has a reducing activity whereas the lower catalyst unit 127 has an oxidising activity.

An exhaust valve 141, which is able to move about the pivot 142, transverse to the exhaust port, is provided to co-operate with the exhaust port 115 in a generally known manner. The exhaust valve 141 does not completely close the port 115 at any stage in the engine's operation, but serves to alter the effective position of the upper edge of the exhaust port thereby by altering the position in the stroke of the piston that the exhaust port commences to open. The valve does not alter its position during each combustion cycle, but is controlled to change in response to engine operating conditions. Such valves and their operation are known to those skilled in the design of modern two stroke engines, and an example is described in Australian patent application No. 57898/86. The valve is shown in FIG. 4 in the position where it is raised to its full extent to give the earliest exhaust port open timing and the maximum open period.

The present exhaust valve 141 as incorporated in the engine has a significant difference to those used previously. As in the conventional construction of such a valve, the present exhaust valve 141 has an operating face 143 shaped to present a face to the combustion chamber when in any operational position that is substantially contiguous with the periphery of the exhaust port, with the leading edge 144 adapted to substantially seal against the piston 12. However, the present exhaust valve 141 is different in comparison with those used previously, by the provision in the operating face 143, and close to the leading edge 144, of a single or series of slots 145 passing through the operating face 143 so as to communicate the exhaust port 115 with the upper exhaust passage 124. During operation of the engine, the only way exhaust gases may pass from the combustion chamber into the upper exhaust passage 124 is by way of the slots 145.

In operation of the engine 110, as the piston travels down on its power stroke and commences to open the exhaust port 115, at every position of the exhaust valve 141 the first exhaust gas to escape through the port is by way of the slots 145. This passes into the upper exhaust passage 124 and on through the upper catalyst unit 126. As the piston travels down further it passes the leading edge 144 of the valve and exhaust gas is then able to pass under the valve 141 into the lower exhaust passage 125 and on through the lower catalyst unit 127. At this stage relatively little exhaust passes through slots 145 into upper passage 124. It is also to be understood that even before the lower exhaust passage has been uncovered pressure pulses generated in the upper exhaust passage 124 will cause a reverse flow back through the upper catalyst unit, and this flow pattern may repeat several times during the open period of the exhaust port.

As explained earlier, the first exhaust gases to escape through port 115 are the products of combustion of a rich air/fuel ratio mixture, having a relatively high NOx content, and require a predominantly reduction catalyst treatment. In contrast the exhaust gases expelled later through the port 115 are a lean air/fuel ratio mixture, incorporating fresh scavenging air, and have a relatively low NOx content but a relatively high hydrocarbons content, and require a predominantly oxidation catalyst treatment. The embodiment of FIG. 4 provides a means by which such selective catalyst treatment may be given to successive portions of the exhaust gases in a single engine cycle, while still preserving the port-timing benefits of the exhaust valve.

The catalyst units 126, 127 may be of the general form described for FIG. 2 and 3 wherein sheet elements are stacked face to face with each other. Preferably however, they have a more conventional substrate having a base structure of suitable ceramic or metallic material providing a multitude of passages. The exposed surfaces of the passages in upper catalyst unit 126 are coated with a suitable reduction promoting material, such as rhodium, whereas the exposed surfaces in lower catalyst unit 127 are coated with a suitable oxidation promoting material such as palladium or platinum.

The engine of FIG. 4 may be modified in the following way to achieve beneficial performance in some applications. Rather than venting the upper manifold cavity 133 to the exhaust system by simply uniting its throughput a short distance downstream from the catalyst unit 126 with that from the lower cavity 134, the upper cavity is instead blanked off such that its only opening is by way of catalyst unit 126 to the cylinder. As described earlier, when the first exhaust gases pass through the exhaust port 115 they enter the upper exhaust passage 124 but cannot enter the lower exhaust passage 125. These gases pass through the reduction catalyst unit 126 and into the upper cavity 133 but can go no further. The cavity 133 thus pressurises, and stays so until the piston 12 passes the leading edge 144 of the exhaust valve and exposes the lower exhaust passage 125, whereupon the compressed gases in the upper cavity 133 pass back through the reduction catalyst unit 126, the upper exhaust passage 124 and the slots 145 into the engine cylinder to then pass through the exhaust port into the lower exhaust passage 125' the lower (oxidation) catalyst unit 127 and the lower manifold cavity 134 to the exhaust pipe In this way, the first gases to pass through the exhaust port experience two passes over the reduction catalyst and one pass over the oxidation catalyst, which gives a significantly improved catalyst treatment to that portion of the exhaust which may most require it. The size and configuration of the upper manifold cavity may be adjusted such that its resonance and effect on pressure waves is beneficial to the trapping efficiency of the engine.

In a further modification to the construction as described with reference to FIG. 4, the lower catalyst unit 127 which treats the gas exhausted late in the exhaust open period, being a chemically oxidising gas, may be located in the exhaust system displaced from adjacent to the exhaust port. If desired this lower catalyst unit 127 may be located in the exhaust manifold in a position where it can treat exhaust gases from two or more cylinders of the same engine.

The two stroke cycle engines, as described above with reference to the accompanying drawings, are each provided with a fuel injection system whereby the fuel is injected directly into the engine cylinder. A particularly advantageous fuel injection apparatus and its operation are described in U.S. Pat. No. 4,693,224. It is however to be understood that the present invention is applicable to two stroke cycle engines which do not have direct fuel injection, provided fuel and air are introduced into the combustion chamber in such a way that the fuel distribution in the combustion chamber at combustion and in the scavenging gases introduced after combustion is such that the air/fuel ratio in the exhaust gases passing through the exhaust ports varies significantly during the course of the exhaust port open period. The invention is also applicable to spark ignition and to diesel engines operating on the two stroke cycle.

The claims defining the invention are as follows:

1. A method of operating a two stroke cycle internal combustion engine wherein for each combustion chamber there is provided means to supply fuel to the combustion chamber, an exhaust port through which gases pass from the combustion chamber to an exhaust system, and at least one inlet port through which a fresh charge of air enters the combustion chamber, the inlet and exhaust ports being arranged so that the inlet port opens prior to the closing of the exhaust port, the method being characterised in that during an exhaust port open period of each combustion chamber a first portion of the gas exhausted from said combustion chamber during the exhaust port open period is directed into contact with a first catalyst means of a first catalytic character, and a subsequent second portion of the gas exhausted from said combustion chamber in the same exhaust port open period is directed into contact with a second catalyst means of a differing catalytic character to the first catalyst means.

2. A method of operating an internal combustion engine as claimed in claim 1 wherein the first catalyst means is of a character to reduce nItrogen oxides in said first portion of gas.

3. A method as claimed in either claim 1 or 2 wherein the second catalyst means is of a character to oxidise hydrocarbons or carbon monoxide in said second portion of gas.

4. A method of operating an internal combustion engine as claimed in claim 2 wherein the first portion of the exhaust gas is directed into contact with the first catalyst means after exhaustion from the combustion chamber and before said first portion has mixed with other exhaust gas from the engine.

5. A method as claimed in claim 1 wherein after the first portion of the exhaust gas has been treated by the first catalyst means at least part of said first portion with the second portion of the exhaust gas are directed into contact with the second catalyst means.

6. A method as claimed in claim 5 wherein at least part of the first portion of the exhaust gas after contact with the first catalyst means is subsequently directed back into the combustion chamber and thereafter is directed with the second portion of the exhaust gas into contact with the second catalyst means.

7. A method as claimed in any one of claims 5 or 6 wherein said part of the first portion of the exhaust gas is entrained with the second portion of the exhaust gas when directed into contact with the second catalyst means.

8. A two stroke cycle internal combustion engine having for each combustion chamber means to supply fuel to the combustion chamber, an exhaust port through which gases pass from the combustion chamber to an exhaust system, and at least one inlet port through which a fresh charge of air enters the combustion chamber, the inlet and exhaust ports being arranged so that the inlet port opens prior to the closing of the exhaust port, characterised in that there is provided in the exhaust system a first catalyst means of a first catalytic character located to receive a first portion of the gas exhausted from the combustion chamber during an exhaust port open period, and second catalyst means to receive a second portion of the gas exhausted from the combustion chamber subsequent to the commencement in the same exhaust port open period of the exhausting of the first portion, said second catalyst means being of a different catalytic character to the first catalyst means.

9. An internal combustion engine as claimed in claim 8 wherein the first catalyst means is of a reducing character.

10. An engine as claimed in claim 8 wherein the second catalyst means is of an oxidising character.

11. An internal combustion engine as claimed in claim 8, 9, or 10 wherein the second catalyst means is located to only receive exhaust gas exhausted from the combustion chamber after the inlet port has opened and while the exhaust port is open.

12. An internal combustion engine as claimed in any one of claims 8 to 10 wherein the first catalyst means is located in the exhaust port of the combustion chamber with one end thereof substantially contiguous with the periphery of the exhaust port, and said first catalyst means extends from the end of the exhaust port that is first exposed during opening of the exhaust port in the direction in which such exposure progresses.

13. An internal combustion engine as claimed in claim 12 wherein the second catalyst means is located in the exhaust port adjoining the first catalyst means and with one end thereof substantially contiguous with the periphery of the exhaust port.

14. An internal combustion engine as claimed in claim 13 wherein the second catalyst means is located in a passage extending from the exhaust port, the end of the second catalyst means adjacent the exhaust port being spaced downstream therefrom.

15. An internal combustion engine as claimed in claim 12 wherein the first catalyst means is located in a cavity communicating at one end with the exhaust port and closed at the other end, with a chamber formed between said closed end of the cavity and the adjacent end of the first catalyst means.

16. An internal combustion engine as claimed in claim 8, 9 or 10 wherein the first catalyst means is located in a cavity that communicates at one end with the exhaust port, and a valve means is provided at said one end of the cavity, said valve means being operable to varying the timing of the communication between the combustion chamber and the cavity through the exhaust port.

17. An internal combustion engine as claimed in claim 16 wherein said valve means is a member mounted for controlled movement relative to the exhaust port so portion of said valve means moves in the direction generally parallel to the axis of the combustion chamber in substantially contiguous relation to the exhaust port, said member having an aperture through said portion to provide said communication with the cavity.

18. A method of operating a two stroke cycle internal combustion engine as claimed in claim 1 wherein the engine is spark ignited.

19. A two stroke cycle internal combustion engine as claimed in claim 8 being a spark ignited engine.

20. A method of operating a two stroke cycle engine as claimed in any claim 1 wherein the fuel is injected directly into the combustion chamber.

21. A two stroke cycle engine as claimed in claim 8 wherein the means to supply fuel is fuel injection means arranged to inject fuel directly into the combustion chamber.

22. A method of operating a two stroke cycle engine as claimed in claim 1 wherein the first portion of the exhaust gases is of a stoichiometric air/fuel ratio or of a reducing character.

23. A two stroke cycle engine as claimed in claim 8 wherein the first portion of the exhaust gases is of a stoichiometric air/fuel ratio or of a reducing character.

* * * * *